United States Patent [19]

Nishitani et al.

[11] Patent Number: 4,562,493

[45] Date of Patent: Dec. 31, 1985

[54] MAGNETIC VIDEO RECORDING APPARATUS FOR INTERMITTENT RECORDING

[75] Inventors: Yoshihisa Nishitani, Suita; Masateru Nakano; Yoshihito Yamamoto, both of Nagaokakyo, all of Japan

[73] Assignee: Mitsubishi Denki Kabushiki Kaisha, Tokyo, Japan

[21] Appl. No.: 567,173

[22] Filed: Dec. 30, 1983

[30] Foreign Application Priority Data

Jan. 11, 1983 [JP] Japan .................................. 58-2967

[51] Int. Cl.[4] ............................................. G11B 15/00
[52] U.S. Cl. .................................. 360/74.1; 360/9.1; 360/35.1
[58] Field of Search ................ 358/108; 360/9.1, 10.1, 360/10.2, 10.3, 11.1, 35.1, 74.1, 73; 369/19

[56] References Cited

U.S. PATENT DOCUMENTS

| | | | |
|---|---|---|---|
| 3,890,640 | 6/1975 | Yabu ..................... | 360/50 |
| 4,075,666 | 2/1978 | Lomax et al. ........... | 360/11 |
| 4,131,919 | 12/1978 | Lloyd et al. ............ | 360/9 |
| 4,238,776 | 12/1980 | Tanaka ................... | 360/10 |
| 4,271,437 | 6/1981 | Scott ..................... | 360/9 |
| 4,290,081 | 9/1981 | Foerster ................. | 358/4 |
| 4,306,254 | 12/1981 | Koda et al. ............. | 360/10 |
| 4,358,797 | 11/1982 | Nishijima et al. ....... | 360/14.2 |
| 4,393,422 | 7/1983 | Yokobori et al. ........ | 360/73 |
| 4,399,473 | 8/1983 | Kaimai et al. ........... | 360/10.3 |
| 4,435,842 | 3/1984 | Mayumi et al. .......... | 455/181 |
| 4,447,835 | 5/1984 | Smith ..................... | 360/10.2 |
| 4,496,998 | 1/1985 | Takimoto ................. | 360/33.1 |

FOREIGN PATENT DOCUMENTS

57-60563  4/1982  Japan ..................................... 369/19

*Primary Examiner*—George G. Stellar
*Attorney, Agent, or Firm*—Lowe King Price & Becker

[57] ABSTRACT

A magnetic video recording apparatus for intermittent recording comprises a magnetic tape driving circuit (30), a video signal recording circuit (20), a control circuit (40) and a recording start instructing circuit (60). The magnetic tape driving circuit (30) makes a magnetic tape (1) travel at a predetermined speed while it is enabled. The video signal recording circuit (20) records a video signal (VS) in the magnetic tape (1) in a predetermined format. The recording start instructing circuit (60) provides intermittently a recording start signal (RS). The control circuit (40) enables the magnetic tape driving circuit (30) in response to the recording start signal (RS), enables the video signal recording circuit (20) for a predetermined period of time and then disables the magnetic tape driving circuit (30). A tape pattern thus recorded in the magnetic tape (1) does not differ from that in an ordinary video tape recorder. Accordingly, the above described magnetic tape (1) can be continuously reproduced by an ordinary video tape recorder.

7 Claims, 17 Drawing Figures

MAGNETIC VIDEO RECORDING APPARATUS FOR INTERMITTENT RECORDING

BACKGROUND OF THE INVENTION

1. Field of the Invention

The present invention relates to a magnetic video recording apparatus and particularly to a magnetic video recording apparatus in which a magnetic tape is made to travel intermittently for recording.

2. Description of the Prior Art

In a conventional video tape recorder currently on the market, for example, a video tape recorder of the VHS system, the tape travelling speed is 33.35 mm/sec±0.5% in the NTSC standard mode, and if a video tape of the type of T-120 is used, the recording time is approximately two hours. In order to extend the recording time, a method is adopted in which the tape travelling speed is reduced to ⅓ so as to make recording for approximately six hours using the tape of the type of T-120. However, as a video tape recorder for surveillance in the banks, parking lots, etc., the recording time is still insufficient.

Therefore, in order to make recording for a further long period of time, a magnetic video recording apparatus for intermittent recording in which a magnetic tape is made to travel intermittently is used these days for surveillance in the bank etc. However, in such a conventional magnetic video recording apparatus for intermittent recording, a magnetic tape travels intermittently and recording is made during a period when the magnetic tape is stopped, and accordingly the tape pattern of the magnetic tape recorded by such apparatus does not conform with the standard tape format of an ordinary video tape recorder currently on the market, in which a tape is made to travel at a fixed speed for continuous recording. Accordingly, in order to reproduce a magnetic tape recorded by a magnetic video recording apparatus for intermittent recording, a special reproducing apparatus other than an ordinary video tape recorder is needed, although a magnetic tape of the same type as in an ordinary video tape recorder is used. This will be explained in detail using drawings.

FIG. 1 is a flow chart showing the recording operation in a conventional magnetic video recording apparatus for intermittent recording. In the step S1, recording start operation is made and then, in the step S2, a magnetic tape is loaded. More specifically, a magnetic tape is withdrawn from the cassette and wound on a rotating drum. In the step S3, a video signal is recorded in the magnetic tape, for one frame for example, in a state where the tape is stopped. In the step S4, the magnetic tape is made to travel and is stopped in a position for recording the next one frame. This stop state of the tape continues till the next recording timing. Then, at the next recording timing, recording is made for one frame (in the step S5), and in the step S6, the magnetic tape is newly made to travel for one frame and is stopped. The above described operations are repeated so that recording is made intermittently.

If a magnetic tape in which recording was made intermittently in the stop periods of the magnetic tape as described above is reproduced by an ordinary video tape recorder which makes recording and reproducing continuously at a fixed speed, inconveniences as described below will occur because of disaccord of the tape formats. In case where the azimuths of the adjacent video tracks are different, the demodulated picture is considerably influenced by noise because of a lack of FM waves due to the azimuth error. On the other hand, in case where the azimuths of the adjacent video tracks are the same, two FM waves simultaneously enter in a reproducing system or insufficiency occurs in a reproduction output, which causes troubles in demodulation. Inconveniences caused by the disaccord of the tape formats as described above will be described in more detail in the following by taking an example of a video tape recorder of the VHS system.

FIGS. 2A and 2C show a relation between a tape pattern recorded by a conventional magnetic video recording apparatus for intermittent recording and a locus of a reproducing head in a video tape recorder of the VHS system. FIGS. 2B and 2D respectively show waveforms of reproduction outputs in the cases of FIGS. 2A and 2C. FIGS. 2A and 2C differ only in the tracking start points of the reproducing heads. The tracking start point can be adjusted in an ordinary video tape recorder. Referring to FIGS. 2A and 2C, in a magnetic tape 1 recorded by a conventional magnetic video recording apparatus for intermittent recording, a tape pattern $P_1$ as shown in drawings is formed. More specifically, in the magnetic tape 1, video tracks $T_A$ and $T_B$ are formed alternately by means of two magnetic heads provided in a rotating drum and having different azimuth angles. In this case, recording is made during the stop of the magnetic tape 1 and, therefore, the angle between the video tracks $T_A$ and $T_B$ and the tape travelling direction is small. On the other hand, in case where the magnetic tape thus recorded is reproduced by an ordinary video tape recorder of the VHS system, the angle of the locus $P_0$ of a reproducing head with respect to the tape travelling direction becomes large since reproduction is made while the magnetic tape travels. More specifically, since the angle of the video tracks $T_A$ and $T_B$ and the angle of the locus $P_0$ of the reproducing head are different, the waveform V of the reproduction output from the reproducing head considerably changes according to a lapse of time as shown in FIGS. 2B and 2D, and insufficiency occurs in the reproduction output. Referring to FIGS. 2B and 2D, the waveforms $V_A$ and $V_B$ of the reproduction outputs are respectively waveforms of the outputs from the reproducing heads having the same azimuth angle as that of the recording heads which record the video tracks $T_A$ and $T_B$. Insufficiency in the reproduction output causes noise in the reproduced picture and accordingly the reproduced picture becomes extremely indistinct. Comparing the tape pattern in FIG. 2A and the tape pattern in FIG. 2C, a larger output of reproduction can be obtained from the tape pattern in FIG. 2C. With this tape pattern, however, still a large noise portion appears in the reproduced picture.

FIG. 3A shows relation between a tape pattern recorded by a conventional magnetic video recording apparatus for intermittent recording having a plurality of recording heads of the same azimuth angle and a locus of a reproducing head in a video tape recorder of the VHS system. FIG. 3B shows reproduction output waveforms in the case of FIG. 3A. The tape pattern $P_2$ in this case is composed of video tracks $T_1, T_2, \ldots$ all having the same azimuth angle. On the other hand, the reproduction output waveforms V are those as shown in FIG. 3B, since in a video tape recorder of the VHS system, two magnetic heads have different azimuth angles. Specifically stated, in the first field, a reproduction output waveform $V_{12}$ (or $V_{34}$) is obtained, but in the second field, no reproduction output is obtained and as a result a noise appears over the whole surface of the picture to be reproduced.

Although the foregoing description was made of a case using a video tape recorder of the VHS system for reproduction, it is just the same with a case using a video tape recorder of the $\beta$ system or the CVC system or a video tape recorder for business use and a reproduced picture without noise or with little noise cannot be obtained either in such a case. Since video tape recorders of the VHS system, the $\beta$ system etc. are widely utilized at present, it is extremely inconvenient that a magnetic tape intermittently recorded cannot be reproduced by such an ordinary video tape recorder put on the market.

SUMMARY OF THE INVENTION

Briefly stated, the present invention is a magnetic video recording apparatus in which a magnetic tape is made to travel intermittently so as to record a video signal therein, the above stated magnetic video recording apparatus comprising: magnetic tape driving means for making the magnetic tape travel at a predetermined speed while the magnetic tape driving means is enabled; video signal recording means for recording a video signal in the magnetic tape in a predetermined format while the recording means is enabled; recording start instructing means for providing intermittently a recording start signal for instructing a start of recording; and control means for enabling the magnetic tape driving means in response to the recording start signal, enabling the video signal recording means during a predetermined period of time when the travelling speed of the magnetic tape attains the predetermined speed and subsequently disabling the magnetic tape driving means.

According to the present invention, a recording start signal is provided intermittently by the recording start instructing means, and in response to this signal, the magnetic tape is made to travel intermittently at a predetermined speed. While the magnetic tape travels at a predetermined speed, a video signal is recorded in the tape. Accordingly, in the present invention, a tape pattern recorded in the magnetic tape conforms with the standard tape format of an ordinary video tape recorder.

Therefore, a principal object of the present invention is to provide a magnetic video recording apparatus for intermittent recording in which a tape pattern of a magnetic tape recorded intermittently conforms with the standard tape format of an ordinary video tape recorder.

A principal advantage of the present invention is that since a tape pattern of a magnetic tape recorded intermittently conforms with the standard tape format of an ordinary video tape recorder, a reproduced picture without noise or with little noise can be obtained even if a magnetic tape recorded intermittently in accordance with the present invention is reproduced continuously by an ordinary video tape recorder. Accordingly a special reproducing apparatus is not needed for reproduction and there is a great merit from an economical point of view.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 2B and 2D show respectively waveforms of reproduction output in the cases of FIGS. 2A and 2C;

DESCRIPTION OF THE PREFERRED EMBODIMENTS

Figure 4:
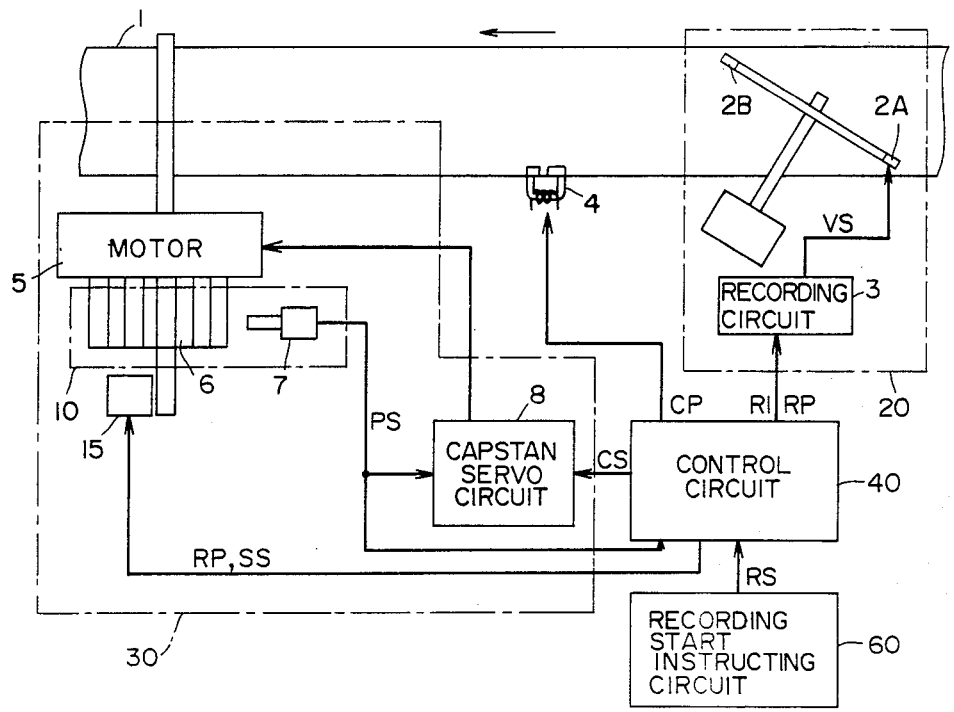
FIG. 4 is a block diagram showing an embodiment of the present invention.

FIG. 4 is a block diagram showing an embodiment of the present invention. An apparatus of this embodiment comprises: a magnetic tape driving circuit 30 for making a magnetic tape 1 travel at a predetermined speed while the driving circuit 30 is enabled; a video signal recording circuit 20 for recording a video signal VS in the magnetic tape 1 in a predetermined format while the recording circuit 20 is enabled; a recording start instructing circuit 60 for providing intermittently a recording start signal RS for instructing a start of recording; and a control circuit 40 for enabling the magnetic tape driving circuit 30 in response to the recording start signal RS, enabling the video signal recording circuit 20 during a predetermined period of time when the travelling speed of the magnetic tape 1 attains the above stated predetermined speed and then disabling the magnetic tape driving circuit 30. The apparatus of this embodiment further comprises a control head 4 for recording a control pulse CP from the control circuit 40 into the magnetic tape 1. The video signal recording circuit 20 comprises a recording circuit 3 for outputting a video signal VS while it is enabled and two magnetic heads 2A and 2B which are made to rotate in a predetermined speed at a predetermined angle with respect to the magnetic tape 1, so that the video signal VS is recorded in the magnetic tape 1. The above stated predetermined angle is for example 5°59'. This value is a value applied to the VHS system. Similarly the values indicated below by way of example are also values applied to the VHS system. The above stated predetermined speed is for example 1800 RPM. The above stated magnetic heads have for example different azimuth angles. The magnetic tape driving circuit 30 comprises: a capstan motor 5 for driving the magnetic tape 1; a pulse signal generator 10 coupled to the capstan motor 5 for providing pulse signals PS according to the rotation of the capstan motor 5; a capstan servo circuit 8 connected to the capstan motor 5 and to the pulse signal generator 10 for driving the capstan motor 5 when the circuit 8 is enabled and controlling the rotational speed of the capstan motor 5 at a predetermined value in response to the pulse signals PS; and a brake 15 coupled to the capstan motor 5 and connected to the control circuit 40 for applying braking to the rotation of the capstan motor 5 or stopping the rotation in response to the signals RP and SS applied thereto. The pulse signal generator 10 comprises a rotor 6 rotating with the capstan motor 5 and a pickup 7 for providing pulse signals PS according to the rotation of the rotor 6. The magnetic tape 1 is made to travel at a speed of 33.35 mm/sec, for example. The pulse signal generator 10 provides, for example, 180 pulse signals for one rotation of the capstan motor 5. The recording start instructing circuit 60 comprises for example a manual switch or a timer. The capstan servo circuit 8 and the recording circuit 3 are not different form those in an ordinary video tape recorder. The control circuit 40 will be described afterwards.

Figure 1:
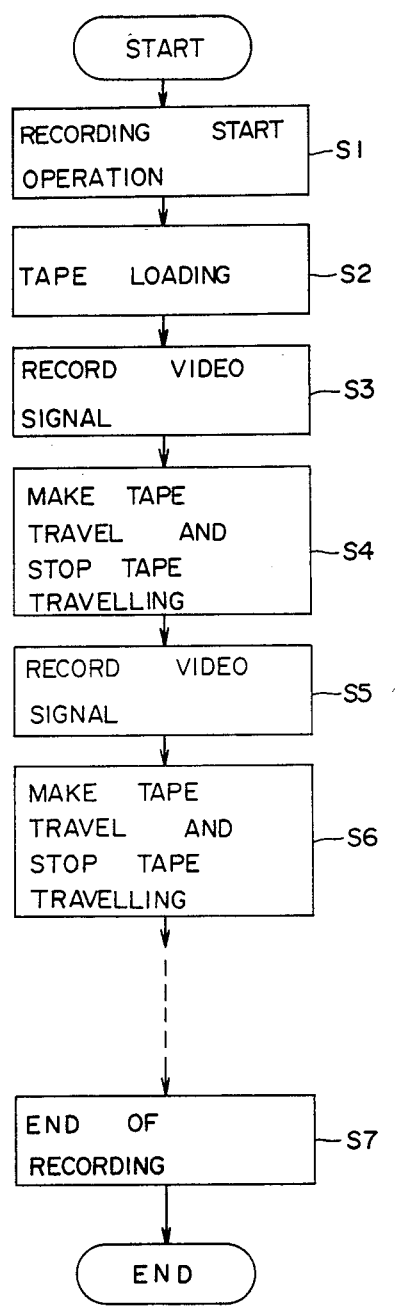
FIG. 1 is a flow chart showing the recording operation in a conventional magnetic video recording apparatus for intermittent recording.
Figure 5:
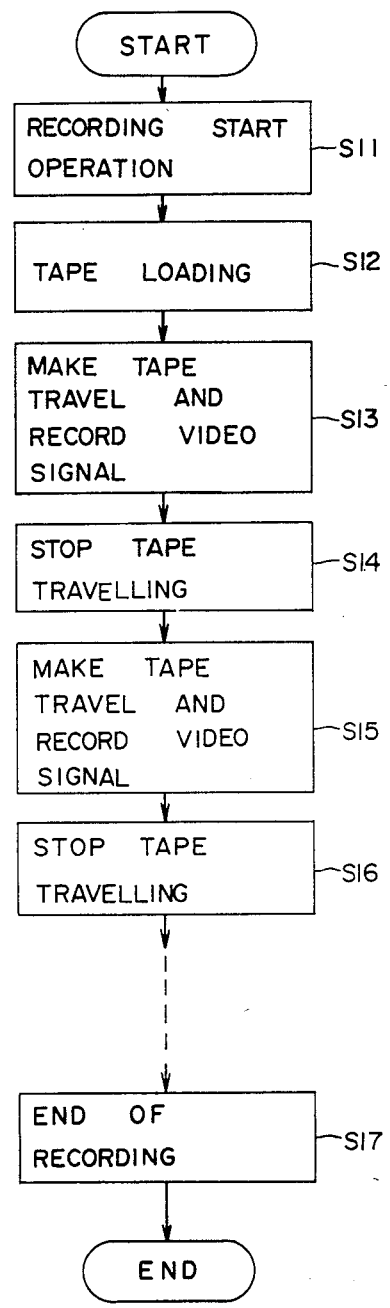
FIG. 5 is a flow chart showing the recording operation in an apparatus shown in FIG. 4.
Figure 2A:
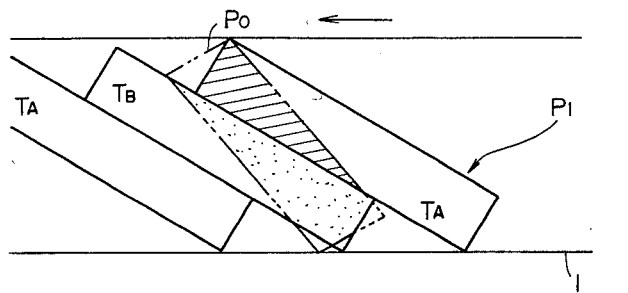
FIGS. 2A through 2D show respectively relation between a tape pattern recorded by a conventional magnetic video recording apparatus for intermittent recording and a locus of a reproducing head in a video tape recorder of the VHS system.
Figure 2B:
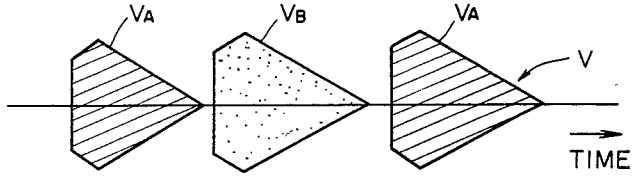
Figure 2C:
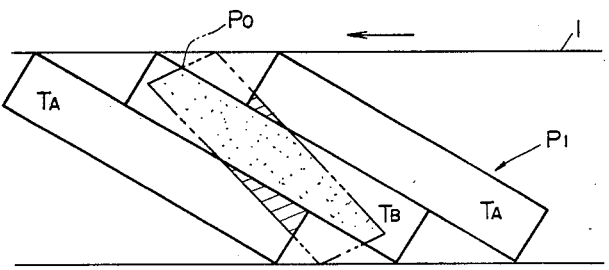
Figure 2D:
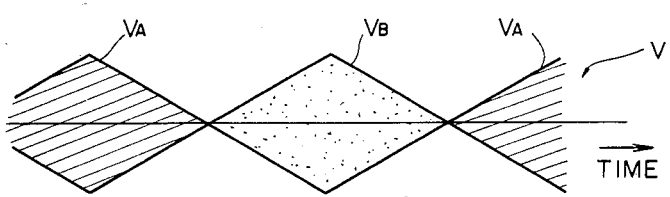
Figure 3A:
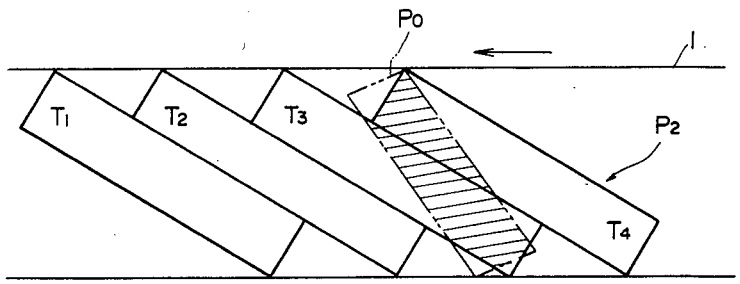
FIG. 3A. shows a relation between a tape pattern recorded by a conventional magnetic video recording apparatus for intermittent recording having a plurality of recording heads of the same azimuth angle and a locus of a reproducing head in a video tape recorder of the VHS system.
Figure 3B:
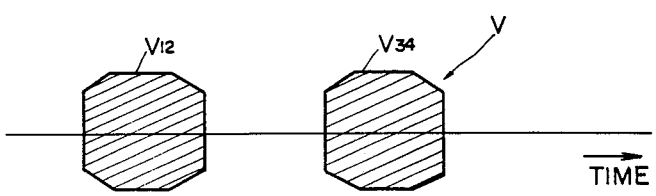
FIG. 3B shows waveforms of reproduction output in the case of FIG. 3A.

First, an outline of the operation of the apparatus shown in FIG. 4 will be described. FIG. 5 is a flow chart showing the recording operation in the apparatus shown in FIG. 4. In the step S11, recording start operation is made and then, in the step S12, the magnetic tape is loaded. In the step S13, the magnetic tape is made to travel at the predetermined speed and at the same time, the video signal is recorded in the magnetic tape for one frame. In the step S14, braking is applied to the travelling of the tape so as to stop the travelling, whereby the apparatus is made to be in a standby state. In the step S15 and the subsequent steps, the same operations as in the above described steps are performed and thus intermittent recording is made. At this time, by changing the period of the above described standby state, an arbitrary period of recording can be obtained. In such case, a tape pattern of the magnetic tape 1 conforms with the standard tape format of an ordinary VHS system video tape recorder, since a video signal is recorded in the magnetic tape 1 while it travels at the predetermined speed. Accordingly if the magnetic tape 1 recorded intermittently is continuously reproduced by an ordinary VHS system video tape recorder, a noiseless clear picture can be obtained.

Figure 6:
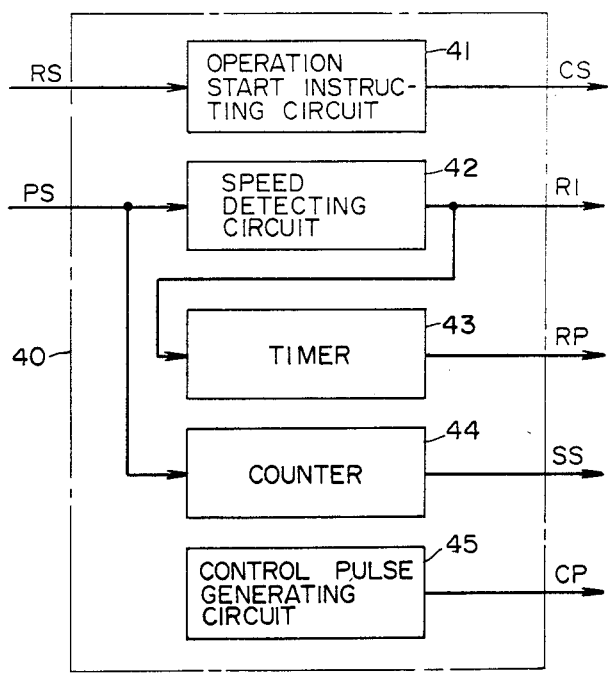
FIG. 6 is a block diagram showing in detail a control circuit in FIG. 4.

FIG. 6 is a block diagram showing in detail the control circuit 40 in FIG. 4. The control circuit 40 comprises: an operation start instructing circuit 41 connected to the recording start instructing circuit 60 so as to enable the capstan servo circuit 8 in response to the recording start signal RS; a speed detecting circuit 42 connected to the pulse signal generator 10 for detecting the fact that the rotational speed of the capstan motor 5 attains the predetermined value by measuring the frequency of pulse signals PS, so that a recording instruction signal RI is provided to enable the video signal recording circuit 20; and a timer 43 for starting measurement of the time in response to the recording instruction signal RI and providing a recording stop signal RP when the above described predetermined period of time has passed, whereby the video signal recording circuit 20 and the capstan servo circuit 8 are disabled. The control circuit 40 further comprises: a counter 44 connected to the pulse signal generator 10 for counting the number of pulse signals PS and providing a stop signal SS to the brake 15 when the count number attains a predetermined number N; and a control pulse generating circuit 45 for providing the above described control pulse CP to the control head 4.

Figure 7:
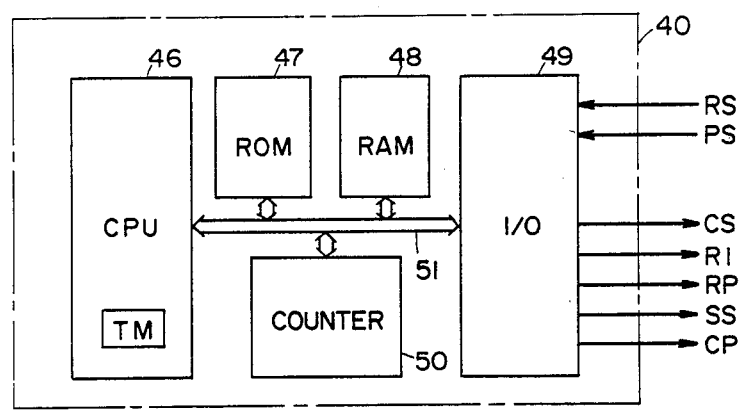
FIG. 7 is a block diagram in case where a control circuit in FIG. 6 is structured by using a microcomputer.

FIG. 7 is a block diagram in case where a control circuit 40 in FIG. 6 is structured by using a microcomputer. The control circuit 40 in this case comprises a central processing unit (CPU) 46, a read-only memory (ROM) 47, a random-access memory (RAM) 48, an input/output (I/O) interface 49, a counter 50 and a bus 51 connecting them. THe control circuit 40 further comprises a timer TM formed of software, for example. To the I/O interface 49, the above described recording start signal RS and pulse signals PS are inputted, and a control signal CS for controlling the capstan servo circuit 8, and the above described recording instruction signal RI, recording stop signal RP, stop signal SS and control pulse CP are outputted therefrom. The counter 50 counts the number of pulse signals PS.

Figure 8:
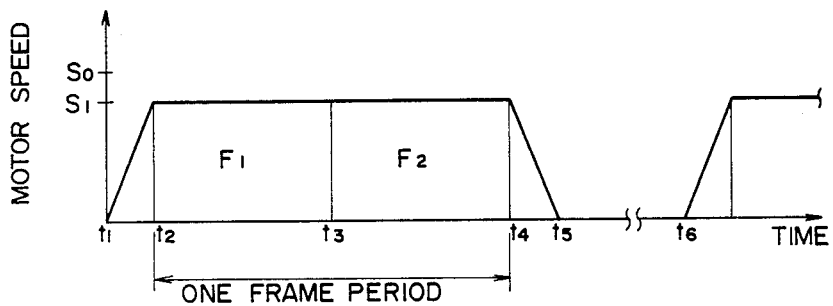
FIG. 8 shows the first mode of intermittent recording in the FIG. 4 embodiment.
Figure 9:
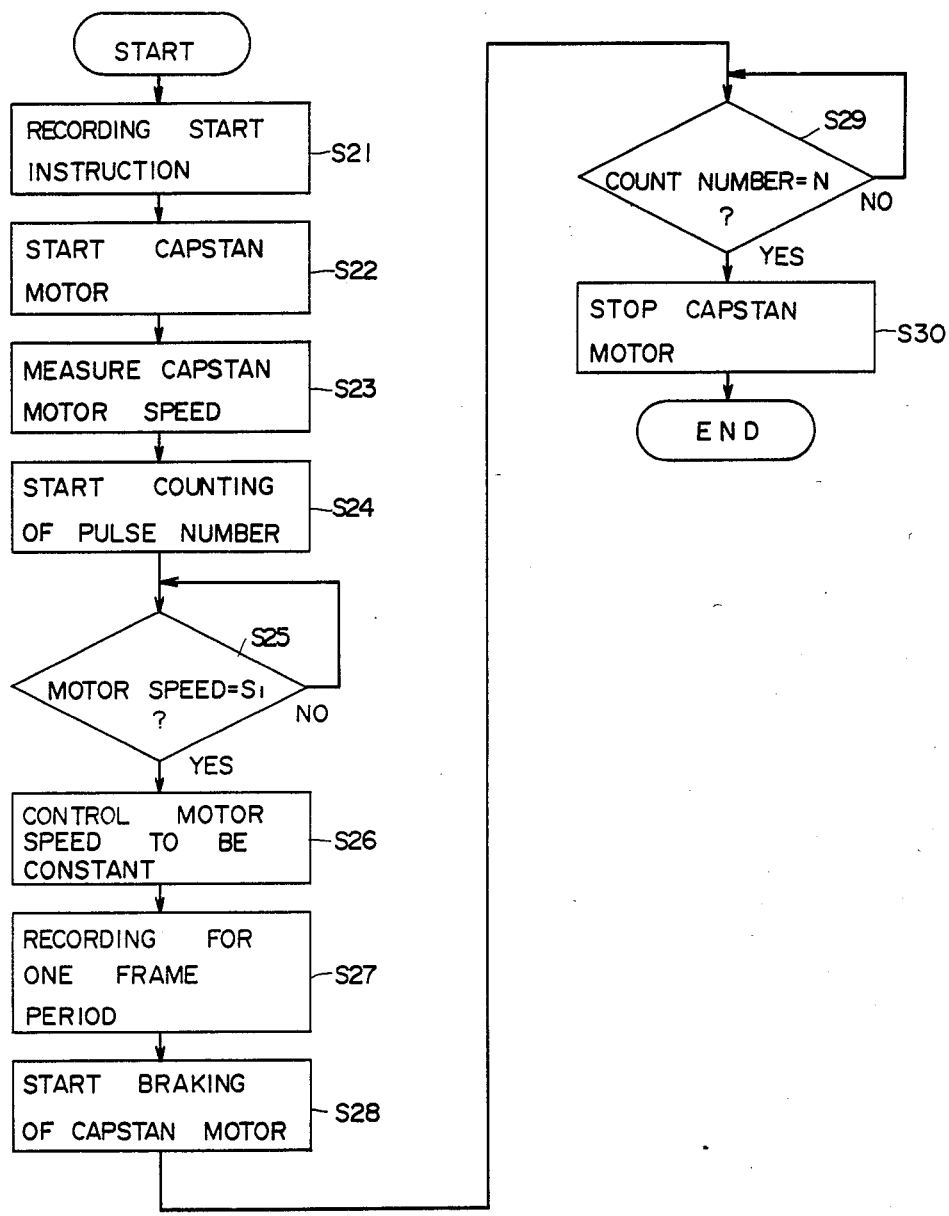
FIG. 9 is a flow chart showing the operation of the first mode in the FIG. 4 embodiment.

Now, a detailed description will be made of the operation at the time of recording in the embodiment shown in FIG. 4. FIG. 8 shows the first mode of intermittent recording in the FIG. 4 embodiment. FIG. 9 is a flow chart showing the operation of the first mode in the FIG. 4 embodiment. In FIG. 8, $F_1$ and $F_2$ represent respectively an odd number field and an even number field. Referring mainly to FIG. 9, in the step S21, when the recording start signal RS is provided from the recording start instructing circuit 60 to the control circuit 40, the control signal CS is provided from the control circuit 40 to the capstan servo circuit 8 in response thereto. Then, in the step S22, the capstan motor 5 starts operation (as shown by the point $t_1$ in FIG. 8). In the step S23, the speed of the capstan motor 5 is measured. This measurement is made by measuring the frequency of pulse signals PS from the pulse signal generator 10. In the step S24, counting of the number of pulse signals PS starts. In the step S25, it is determined whether the speed of the capstan motor attains a predetermined speed $S_1$ or not. For example, assuming that the speed of the capstan motor corresponding to the standard tape speed 33.35 mm/sec of the VHS system is $S_0$, it is determined in the step S25 whether or not the speed of the capstan motor becomes the speed $S_1$ expressed by the following equation.

$$S_1 = \gamma \cdot S_0$$

where $0 < \gamma < 1$. When the speed of the capstan motor becomes $S_1$, the recording instruction signal RI is applied from the control circuit 40 to the recording circuit 3. In the step S26, the speed of the capstan motor is controlled to the fixed speed $S_1$ by the capstan servo circuit 8. In the step S27, the video signal is recorded in the magnetic tape 1 for one frame period. More particularly, the video signal recording circuit 20 starts recording in response to the recording instruction signal RI applied from the control circuit 40. At the same time, the timer 43 in the control circuit 40 measures one frame period and, when one frame period has passed, the recording stop signal RP is supplied to the video signal recording circuit 20, so that recording is stopped (as shown by the points $t_2$ to $t_4$ in FIG. 8). One frame period as described above is for example 33.33 msec. In the step S28, the brake 15 applies braking to the capstan motor 5 (as shown by the point $t_4$ in FIG. 8). In the step S29, it is determined whether the count number of the counter 44 becomes N or not. If the number becomes N, the program proceeds to the step S30. N is a number corresponding to a travelling distance of the magnetic tape 1 for one frame and is for example 16. When the count number in the counter 44 attains N, the stop signal SS is provided from the control circuit 40 to the brake 15 and, in the step S30, the rotation of the capstan motor 15 is stopped (as shown by the point $t_5$ in FIG. 8). Thus, recording for one frame is completed. The apparatus shown in FIG. 4 is in a standby state at this time. It starts again the operations of the above stated steps when the recording start signal RS is newly provided from the recording start instructing circuit 60 (as shown by the point $t_6$ in FIG. 8).

In the above described first mode, the rotational speed $S_1$ of the capstan motor is smaller than the predetermined speed $S_0$ of the VHS system and accordingly there is not a perfect interchangeability with the VHS system video tape recorder. However, it matters little, since the magnetic tape is recorded while travelling. On the contrary, since reverse travelling as in the second mode to be described below is not needed, there is an advantage that small frequencies of recording can be provided. More specifically, recording cannot be made while the tape travels reversely, but since such reverse travelling is not needed in the first mode, recording for another frame can be started immediately after the end of recording of the previous one frame.

Figure 10A:
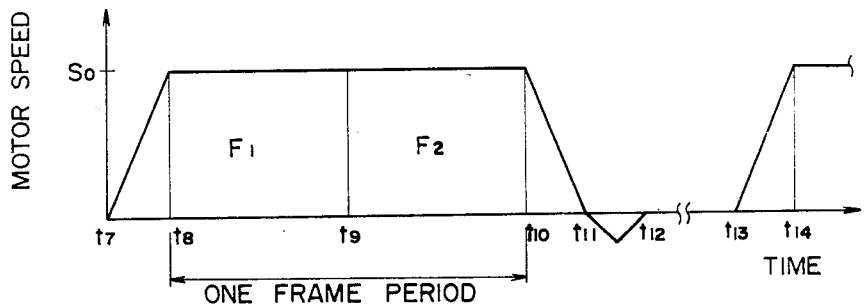
FIG. 10A shows the second mode of intermittent recording in the FIG. 4 embodiment.
Figure 10B:
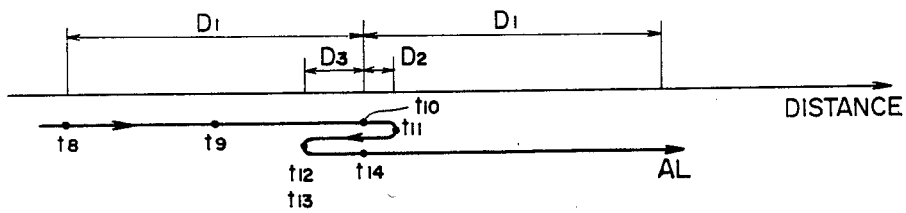
FIG. 10B shows movement of a magnetic tape in the mode shown in FIG. 10A.
Figure 11:
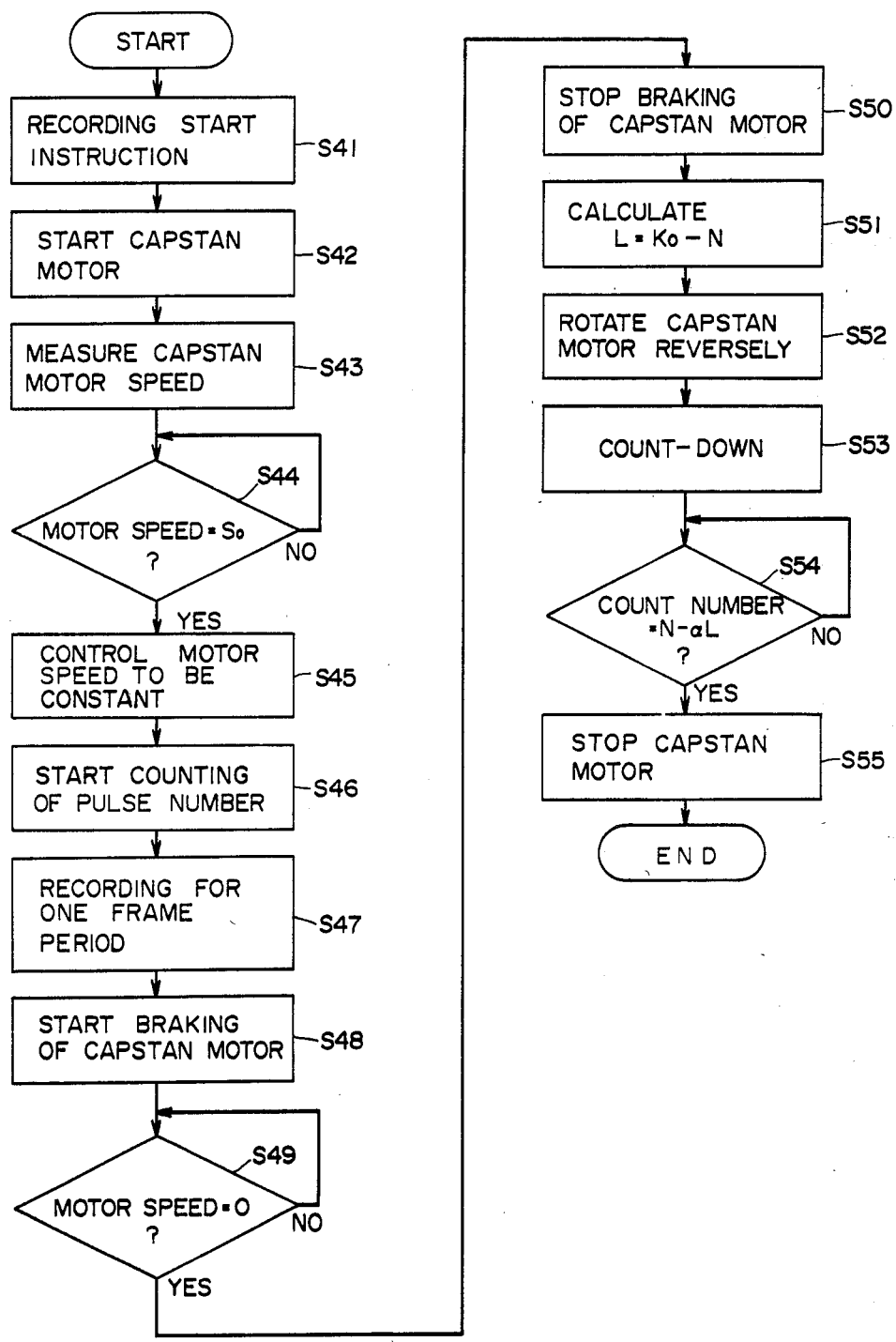
FIG. 11 is a flow chart showing the operation of the second mode in the FIG. 4 embodiment.

FIG. 10A shows the second mode of intermittent recording in the FIG. 4 embodiment. FIG. 10B shows movement of the magnetic tape in the mode shown in FIG. 10A. FIG. 11 is a flow chart showing the operation of the second mode in the FIG. 4 embodiment. In FIG. 10B, the arrow AL shows a travelling direction of the tape. The following description will be made concerning mainly the difference from the above described first mode. Briefly stated, the difference is that the magnetic tape 1 is made to travel reversely by a small distance in the second mode. In order to perform the operations in the second mode, the capstan servo circuit 8 further comprises a reversing circuit for reversing the rotating direction of the capstan motor 5 in response to a reversing signal applied thereto. As the control circuit 40, a control circuit shown in FIG. 7 is used. Referring mainly to FIG. 11, operations in the steps S41 to S43 are the same as the above described operations in the steps S21 to S23. In the step S44, it is determined whether or not the rotational speed of the capstan motor 5 attains the above stated predetermined speed $S_0$. Operations in the steps S45, S47 and S48 are the same as those in the steps S26 to S28 described above. In the step S46, count-up of the number of pulse signals PS is started. In the step S49, it is determined whether or not the rotational speed of the capstan motor 5 becomes zero. If it is zero, the program proceeds to the step S50, where the brake 15 is disabled and application of braking to the capstan motor stops. In the step S51, at the time when the rotational speed of the capstan motor 5 becomes zero, a value L is obtained by calculation of the following equation using the count number $K_0$ of the counter 50.

$$L = K_0 - N$$

where N is a number corresponding to a travelling distance of the magnetic tape for one frame as described above, and is for example 16. In the step S52, the control signal CS for reversing the rotation of the capstan motor 5 is applied from the control circuit 40 to the capstan servo circuit 8, so that the capstan motor 5 starts to rotate reversely (as shown by the point $t_{11}$ in FIG. 10A). In the step S53, the counter 50 starts countdown in response to the reverse rotation of the capstan motor and in the step S54, it is determined whether or not a new count number K is the following.

$$K = N - \alpha L$$

where $1 < \alpha < 2$. If the count number K becomes a value obtained by the above indicated equation, the rotation of the capstan motor 5 is stopped in the step S55 (as shown by the point $t_{12}$ in FIG. 10A). Subsequently, the same operation as described above are repeated intermittently after the lapse of a standby period. The above described operations will be summarized in the following with respect to the movement of the magnetic tape 1 referring to FIG. 10B. Before the start of recording the capstan motor 5 is made to start operation and recording is made for one frame period from the point $t_8$ where the tape travelling speed attains a predetermined speed of an ordinary video tape recorder, that is, from the point $t_8$ to the point $t_{10}$. During this period, the magnetic tape is made to travel by a distance $D_1$ corresponding to one frame. From the point $t_{10}$, braking is applied to the magnetic tape 1 and at the point $t_{11}$, the magnetic tape stops. Accordingly, the magnetic tape travels by a surplus distance $D_2$ besides the distance corresponding to one frame. Therefore, during a period from the point $t_{11}$ to the point $t_{12}$, the capstan motor is made to rotate reversely, so that the magnetic tape travels reversely by a distance $(D_2+D_3)$. The distance $D_3$ in this case is a distance required for the travelling speed of the magnetic tape to rise from zero to the predetermined speed. Thus, the magnetic tape 1 is always made to travel at the predetermined speed in case where a video signal is recorded therein and as a result, the tape format formed by the intermittent recording can completely coincide with the standard tape format of the VHS system. Accordingly, if a magnetic tape recorded intermittently in this mode is continuously reproduced by an ordinary VHS system video tape recorder, a noiseless clear picture can be obtained.

Now, let us take an example of a VHS system video tape recorder so as to show an example of calculation of the error in a tape travelling amount in the second mode of the FIG. 4 embodiment in relation to a tape travelling amount of a VHS system video tape recorder. The tape travelling amount in the standard mode of a VHS system video tape recorder is determined to 33.35 mm/sec±0.5% and the time required for the tape travelling amount for one frame is 1/30 sec. Assuming that the capstan diameter of the capstan motor 5 is Dmm, a tape travelling amount T of a VHS system video tape recorder with respect to the frames is calculated by the following equation, for one rotation of the capstan motor.

$$T = \frac{\text{Tape travelling amount for one rotation of the motor}}{\text{Tape travelling amount for one frame}}$$

$$= \frac{\pi D}{33.35/30}$$

On the other hand, in this embodiment, a tape travelling amount for one rotation of the capstan motor 5 is X/N frames, assuming that the number of pulse signals PS provided from the pulse signal generator 10 by one rotation of the capstan motor 5, that is, the resolution is X and the number of pulse signals PS for the tape travelling amount corresponding to one frame is N. Accordingly, a ratio of the tape travelling amount of the present embodiment to the tape travelling amount of a VHS system video tape recorder, that is, the error E in tape travelling amount is expressed by a general formula as follows.

$$E = \left(\frac{X}{N}\right) \div \left(\frac{\pi D}{33.35/30}\right)$$

Assuming that the diameter D of the capstan is 3.997 mm, the resolution X of the pulse signals for one rotation of the capstan motor is 180 and the number N of pulse signals for the tape travelling amount corresponding to one frame is 16, for example, the above described error E becomes as follows.

$$E = \frac{11.25}{11.2956} = 0.99596$$

Thus, the tape travelling amount in this embodiment is smaller than that of a VHS system video tape recorder only by approximately 0.4%. This value 0.4% meets the condition of permissible error ±0.5% in the VHS system. Therefore, it can be said that there is complete interchangeability between a magnetic recording apparatus in accordance with this embodiment of the present invention and a video tape recorder of the VHS system.

Figure 12:
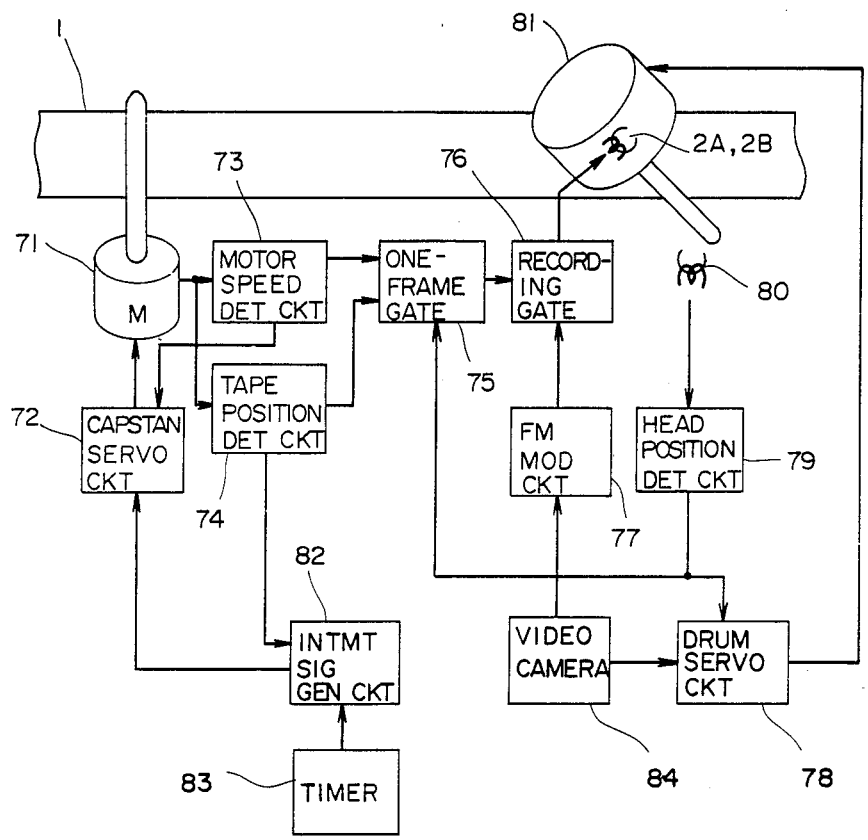
FIG. 12 is a block diagram showing another embodiment of the present embodiment.

Finally, another embodiment of the present invention will be described. FIG. 12 is a block diagram showing another embodiment of the present invention. A capstan motor 71 and a capstan servo circuit 72 nearly correspond to the magnetic tape driving circuit 30 in FIG. 4. A capstan motor speed detecting circuit 73, a tape position detecting circuit 74 and a one-frame gate 75 nearly correspond to the control circuit 40 in FIG. 4. A recording gate 76, a frequency modulation circuit 77, a drum servo circuit 78, a video head position detecting circuit 79, a video head position detecting head 80, a rotating drum 81 and magnetic heads 2A and 2B nearly correspond to the video signal recording circuit 20 in FIG. 4. An intermittent signal generating circuit 82 and a programmable timer 83 nearly correspond to the recording start instructing circuit 60 in FIG. 4.

A video signal provided from a video camera 84 is made to be a frequency modulated wave by means of the frequency modulation circuit 77 so as to be constantly added to the recording gate 76. While the magnetic heads 2A and 2B rotate constantly with a predetermined rotational speed, application of the FM signals is stopped by the recording gate 76 and normally recording is not made in the magnetic tape 1. On the other hand, the capstan motor 71 is normally stopped and accordingly the magnetic tape 1 is also stopped. When the time to start recording comes, a signal is applied from the programmable timer 83 to the intermittent signal generating circuit 82 so that the circuit 82 is operated. The signal from the intermittent signal generating circuit 82 is applied to the capstan servo circuit 72, whereby the capstan motor 71 is driven. The rotational speed of the capstan motor 71 is detected by the capstan motor speed detecting circuit 73 and the rotation period of the capstan motor 71 is detected by the tape position detecting circuit 74. Position data of the magnetic heads 2A and 2B are obtained by processing the signals from the video head position detecting head 80 in the video head position detecting circuit 79, so that the results thus obtained are applied to the one-frame gate 75. The one-frame gate 75 is controlled by the tape position data from the tape position detecting circuit 74, the video head position data from the video head position detecting circuit 79 and the tape speed data from the capstan motor speed detecting circuit 73. More specifically, when the tape speed is in the permissible range of the standard format and the position of the magnetic tape and the positions of the magnetic heads 2A and 2B meet the predetermined conditions, a signal is applied from the one-frame gate 75 to the recording gate 76, so that a video signal is written in the magnetic tape 1 during a predetermined period of time. The drum servo circuit 78 operates based on the vertical synchronizing signal from the video camera 84 and the video head position data from the video head position detecting circuit 79 so as to constantly rotate the rotating drum 81 in synchronism with the signal from the video camera 84. Also in the embodiment as shown in FIG. 12, almost the same operations as in the embodiment shown in FIG. 4 can be performed.

Although the foregoing description was made by using as an example a case where the magnetic tape is made to travel intermittently for one frame, the present invention is not limited to the case. The magnetic tape may be made to travel intermittently for M frames (M=1,2,...). In addition, although the above description was made of the embodiments realizing interchangeability with a video tape recorder of the VHS system, it can be easily understood that interchangeability with a video tape recorder of the 8 system etc. is also realized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic video recording apparatus for making magnetic tape (1) travel intermittently so as to record a video signal (VS) therein, comprising:
   magnetic tape driving means (30) for making said magnetic tape (1) travel at a predetermined speed while said magnetic tape driving means (30) is enabled,
   video signal recording means (20) for recording said video signal (VS) in said magnetic tape (1) in a predetermined format while said video signal recording means (20) is enabled,
   recording start instructing means (60) for providing intermittently a recording start signal (RS) for instructing a start of recording, and
   control means (40) connected to said magnetic tape driving means (30), said video signal recording means (20) and said recording start instructing means (60) for enabling said magnetic tape driving means (30) in response to said recording start signal (RS), enabling said video signal recording means (20) for a predetermined period of time when the travelling speed of said magnetic tape (1) attains said predetermined speed, and then disabling said magnetic tape driving means (30).

2. A magnetic video recording apparatus in accordance with claim 1, wherein
said magnetic tape driving means (30) comprises:
a capstan motor (50) for driving said magnetic tape (1),
pulse signal generating means (10) coupled to said capstan motor (5) for providing pulse signals (PS) according to a rotation of said capstan motor (5), and
servo means (8) connected to said capstan motor (5) and said pulse signal generating means (10) for driving said capstan motor (5) when said servo means is enabled and controlling a rotational speed of said capstan motor (5) to a predetermined value ($S_0$ or $S_1$) in response to said pulse signals (PS), and
said control means (40) comprises:
operation start instructing means (41) connected to said recording start instructing means (60) for enabling said servo means (8) in response to said recording start signal (RS),
speed detecting means (42), connected to said pulse signal generating means (10) for detecting that the rotational speed of said capstan motor (5) attains said predetermined value ($S_0$ or $S_1$) by measuring the frequency of said pulse signals (PS), so as to provide a recording instruction signal (RI), whereby said video signal recording means (20) is enabled, and
first timer means (43) for starting measurement of the time in response to said recording instruction signal (RI) and providing a recording stop signal (RP) at the time when said predetermined period of time has passed, whereby said video signal recording means (20) and said servo means (8) are disabled.

3. A magnetic video recording apparatus in accordance with claim 2, wherein
said magnetic tape driving means (30) further comprises brake means (15) coupled to said capstan motor (5) and connected to said control means (40) for applying braking to the rotation of said capstan motor (5) in response to said recording stop signal (RP) and stopping the rotation of said capstan motor (5) in response to a stop signal (SS) applied thereto, and
said control means (40) further comprises first counter means (44) connected to said pulse signal generating means (10) for counting the number of said pulse signals (PS) so as to provide said stop signal (SS) when the count number attains a predetermined number (N).

4. A magnetic video recording apparatus in according with claim 1, wherein said video signal recording means (20) comprises:
a recording circuit (3) for providing said video signal (VS) while said recording circuit (3) is enabled, and
a plurality of magnetic heads (2A and 2B) for recording said video signal (VS) in said magnetic tape (1), while being rotated in a predetermined speed at a predetermined angle with respect to said magnetic tape (1).

5. A magnetic video recording apparatus in accordance with claim 1, wherein said recording start instructing means comprises second timer means for providing intermittently said recording start signal (RS).

6. A magnetic video recording apparatus in accordance with claim 2, wherein
said predetermined period of time is a period corresponding to the recording of M frames (where M=1, 2, 3, ...),
said servo means (8) further comprises reversing means for reversing the rotating direction of said capstan motor (5) in response to a reversing signal applied thereto,
said speed detecting means (42) further provides a zero speed signal by detecting that the rotational speed of said capstan motor (5) becomes zero, and
said control means (4) further comprises:
second counter means connected to said pulse signal generating means (10) for starting count-up of the number of said pulse signals (PS) in response to said recording instruction signal (RI) and starting count-down of the number of said pulse signals (PS) in response to a reversing signal applied thereto, and
reversing control means for enabling said servo means (8) in response to said zero speed signal, providing said reversing signal, obtaining a value L by calculation of the following equation using a count number $K_0$ of said second counter means at the time when said zero speed signal is provided, $$L = K_0 - N$$

where N is a number corresponding to the travelling distance of said magnetic tape (1) for said M frames, and disabling said servo means (8) when a new count number K of said second counter means becomes a value obtained by the following equation:

$$K = N - \alpha L$$

where $\alpha$ is $1 < \alpha < 2$.

7. A magnetic video recording apparatus in accordance with claim 6, wherein said magnetic tape driving means (3) further comprises brake means (15) coupled to said capstan motor (5) and connected to said control means (40) for applying braking to the rotation of said capstan motor (5) in response to said recording stop signal (RP) and stopping the braking in response to said zero speed signal.

* * * * *